UNITED STATES PATENT OFFICE.

JAMES P. PERKINS, OF PULLMAN, ILLINOIS.

METHOD OF MAKING BRICK, &c.

SPECIFICATION forming part of Letters Patent No. 318,792, dated May 26, 1885.

Application filed April 11, 1885. (No specimens.)

*To all whom it may concern:*

Be it known that I, JAMES P. PERKINS, of Pullman, in the county of Cook and State of Illinois, have invented certain new and useful Improvements in Methods of Making Bricks and other Burned Products of Clay; and I do hereby declare that the following is a full, clear, and exact description thereof.

This invention has for its object to facilitate the manufacture and to improve the burned products of clays, and more particularly the products of terra-cotta and inferior clays.

To this end the invention consists in mixing oil with the clay or earth before molding or shaping the latter. By this means the article formed is adapted to draw from the mold with a smooth surface and without "slushing" the mold to obtain this result. The article is given a closer texture. The burning is rendered more rapid, uniform, and even throughout each individual article and throughout the kiln, because the oil thus added serves as a fuel. The color of the burned or finished product is greatly improved, and a sort of glazing of the surface is obtained in the operation of burning, which materially adds to the durability and increases both the market and the inherent value of the product.

In carrying out my invention I prefer to use crude petroleum for imparting the desired oiliness to the clay or earth, principally because of its cheapness and abundance, but also in part because its solids are of an earthy or mineral character, and are in every particular unobjectionable in the mixture sought to be produced. Preparatory to the addition of the oil to the clay, I prefer to grind the latter at least to some extent, though this is not strictly necessary. The mixing of the oil with the clay may be effected by any suitable means, and may in some instances be perfectly accomplished in the operation of grinding, while in others it may be as well done by a suitable mixing-machine after the clay has been ground or otherwise disintegrated. The amount of oil necessary or desirable to be added will vary according to the character of the earth or clay to be treated, and can be readily determined by the manufacturer by trial. In the case of the ordinary brick-clays of the northwest, a barrel of crude oil may be added to clay enough to make five thousand bricks. In burning the brick this oil ignites and constitutes the principal fuel for accomplishing the work, and in burning out of the bricks imparts a glazed or hardened surface thereto, which materially improves their appearance and enhances their durability and value. The presence of the oil in the clay also greatly facilitates the operation of molding, particularly in the case of tiles and other articles, which are drawn from or are forced between forming-surfaces. The invention thus enables a superior product to be made from inferior clay, and results in the saving of the large expense attendant upon the transportation of the better class of burned clay products from those regions where the material is in a naturally oily state to those where only inferior clay is found.

I claim as my invention—

The method of making burned products of clay, which consists in mixing oil with the clay preparatory to forming and burning such products.

In testimony that I claim the foregoing as my invention I affix my signature in presence of two witnesses.

JAMES P. PERKINS.

Witnesses:
M. E. DAYTON,
OLIVER E. PAGIN.